US012662188B2

(12) United States Patent
Kim

(10) Patent No.: US 12,662,188 B2
(45) Date of Patent: Jun. 23, 2026

(54) STEERING ANGLE ESTIMATION DEVICE AND METHOD FOR ELECTRIC STEERING SYSTEM

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/944,768

(22) Filed: Nov. 12, 2024

(65) Prior Publication Data

US 2025/0206370 A1     Jun. 26, 2025

(30) Foreign Application Priority Data

Dec. 22, 2023     (KR) ........................ 10-2023-0189872

(51) Int. Cl.
B62D 6/00          (2006.01)
B62D 5/04          (2006.01)
(52) U.S. Cl.
CPC ............. B62D 6/002 (2013.01); B62D 5/046 (2013.01); B62D 6/001 (2013.01)
(58) Field of Classification Search
CPC ...... B62D 6/002; B62D 15/024; B62D 6/001; B62D 15/0235
See application file for complete search history.

(56) References Cited

U.S. PATENT DOCUMENTS

| | | | | |
|---|---|---|---|---|
| 6,611,781 B1 * | 8/2003 | Gutmann | .................. | G01P 3/50 |
| | | | | 702/148 |
| 7,885,750 B2 * | 2/2011 | Lu | ........................ | B60W 40/076 |
| | | | | 180/197 |
| 8,855,885 B2 * | 10/2014 | Takenaka | ................ | B60T 8/172 |
| | | | | 701/72 |
| 10,661,830 B1 * | 5/2020 | Gunbatar | ............. | G05D 1/0278 |
| 2011/0295457 A1 * | 12/2011 | Linda | ...................... | B60T 8/172 |
| | | | | 701/498 |
| 2014/0350818 A1 * | 11/2014 | Obermuller | ............. | B60T 8/172 |
| | | | | 701/74 |
| 2020/0023889 A1 * | 1/2020 | Rohrmoser | .......... | B62D 5/0463 |

FOREIGN PATENT DOCUMENTS

KR     10-2007-00072704 A     7/2007

* cited by examiner

*Primary Examiner* — Long T Tran
(74) *Attorney, Agent, or Firm* — Morgan, Lewis & Bockius LLP

(57)                    ABSTRACT
A steering angle estimation device of an electric steering system. A first operator calculates a yaw rate. a second operator calculates an average value of rear wheel speeds. A Kalman filter predicts a yaw acceleration by filtering the yaw rate. A third operator estimates a steering angle also taking into account a slip angle by using the yaw rate and the yaw acceleration. A weight adjuster adjusts weights of the wheel speeds by averaging rear right and left wheel speeds calculated by the second operator. A multiplication operator multiplies weight values output by the weight adjuster with the steering angle. A steering angle conversion switch outputs a final steering angle by selecting the estimated steering angle output from the multiplication operator or a motor steering angle measured from a motor of a motorized power steering system by the weight values.

15 Claims, 3 Drawing Sheets

$V_r$ = REAR RIGHT WHEEL SPEED [km/h]
$V_l$ = REAR LEFT WHEEL SPEED [km/h]
d = trac width [m]
L = WHEEL BASE [m]
$\psi$ = Yaw rate [m/s]
$\hat{\dot{\psi}}$ = ESTIMATED YAW RATE ACCELERATION [m/s^2]

FIG.3

$$A = \begin{bmatrix} 1 & dt; \\ 0 & 1 \end{bmatrix} \qquad H = \begin{bmatrix} 1 & 0 \end{bmatrix}$$

$$Q = \begin{bmatrix} 0.1 & 0 \\ 0 & 1 \end{bmatrix} \qquad R = 0.2$$

1

STEERING ANGLE ESTIMATION DEVICE AND METHOD FOR ELECTRIC STEERING SYSTEM

CROSS-REFERENCE TO RELATED APPLICATION

This application claims priority from and the benefit of Korean Patent Application No. 10-2023-0189872, filed on Dec. 22, 2023, which is hereby incorporated by reference for all purposes as if set forth herein.

BACKGROUND

Field

Exemplary embodiments of the present disclosure relate to a steering angle estimation device and method of an electric steering system, the device and method being able to estimate a steering angle for position control of an electric steering system in autonomous driving without a steering angle sensor.

Discussion of the Background

In the related art, research is underway to estimate a steering angle in an electric steering system without steering angle sensors based on vehicle dynamics.

However, when error tolerance is required to a very precise level of less than one degree in autonomous driving, this approach is not satisfactory.

This is because even in the case where the steering angle is estimated, it is virtually impossible to estimate the steering angle very accurately due to a slip angle (i.e., an angle that represents the difference between the direction of the tire and the direction in which the tire is actually traveling) occurring during high-speed driving, external influences such as road surface conditions, and the like.

Due to such problems, performing autonomous position control using steering angle estimation based on vehicle dynamics has not only the problem of low responsiveness, but also the problem of low accuracy.

The background technology of the present disclosure is disclosed in Korean Patent Application Publication No. 10-2007-0072704 (published on Jul. 5, 2007).

SUMMARY

Various embodiments are directed to a steering angle estimation device and method of an electric steering system, the device and method being able to estimate a steering angle for position control of an electric steering system in autonomous driving without a steering angle sensor.

According to an aspect of the present disclosure, a steering angle estimation device of an electric steering system includes: a first operator configured to receive rear wheel speeds and calculate a yaw rate using the rear wheel speeds; a second operator configured to calculate an average value of the rear wheel speeds; a Kalman filter configured to predict a yaw acceleration by filtering the yaw rate calculated by the first operator; a third operator configured to receive the predicted yaw acceleration from the Kalman filter and estimate a steering angle also taking into account a slip angle by using the yaw rate calculated by the first operator and the yaw acceleration predicted by the Kalman filter; a weight adjuster configured to adjust weights of the rear wheel speeds by averaging a rear right wheel speed and a rear left wheel speed calculated by the second operator; a multiplication operator configured to multiply weight values output by the weight adjuster with the steering angle estimated by the third operator; and a steering angle conversion switch configured to output a final steering angle by selecting the estimated steering angle output from the multiplication operator or a motor steering angle measured from a motor of a motorized power steering system by the weight values output from the weight adjuster.

In the present disclosure, wherein the first operator may calculate the yaw rate using the rear right wheel speed, the rear left wheel speed, and a track width.

In the present disclosure, the average value of the rear wheel speeds may be an average value of the rear right wheel speed and the rear left wheel speed.

In the present disclosure, the third operator may perform sensitivity tuning of the steering angle according to characteristics of a vehicle using a constant.

In the present disclosure, in response that the wheel speeds are sufficient to estimate the steering angle, the weight adjuster may increase the weights.

According to an aspect of the present disclosure, a steering angle estimation method of an electric steering system includes: calculating, by a first operator, a yaw rate; calculating, by a second operator, an average value of rear wheel speeds; predicting, by a Kalman filter, a yaw acceleration by filtering the yaw rate calculated; estimating, by a third operator, a steering angle also taking into account a slip angle by using the yaw rate calculated by the first operator and the yaw acceleration predicted by the Kalman filter; adjusting, by a weight adjuster, weights of the rear wheel speeds by averaging a rear right wheel speed and a rear left wheel speed calculated by the second operator; multiplying, by a multiplication operator, weight values output by the weight adjuster with the steering angle estimated by the third operator; and outputting, by a steering angle conversion switch, a final steering angle by selecting the estimated steering angle output from the multiplication operator or a motor steering angle measured from a motor of a motorized power steering system by the weight values output from the weight adjuster.

In the present disclosure, the first operator may calculate the yaw rate using the rear right wheel speed, the rear left wheel speed, and a track width.

In the present disclosure, in the operation of calculating the average value of the rear wheel speeds, the average value of the rear wheel speeds may be an average value of the rear right wheel speed and the rear left wheel speed.

In the present disclosure, in the operation of estimating the steering angle, the third operator may perform sensitivity tuning of the steering angle according to characteristics of a vehicle using a constant.

In the present disclosure, in the operation of adjusting the weights of the wheel speeds, in response that the wheel speeds are sufficient to estimate the steering angle, the weight adjuster may increase the weights.

According to the present disclosure, it is possible to estimate a steering angle for position control of an electric steering system in autonomous driving without a steering angle sensor.

BRIEF DESCRIPTION OF THE DRAWINGS

FIG. 3 is an example view illustrating matrices obtained from system models of the Kalman filter of FIG. 2.

DETAILED DESCRIPTION OF THE ILLUSTRATED EMBODIMENTS

Figure 1:
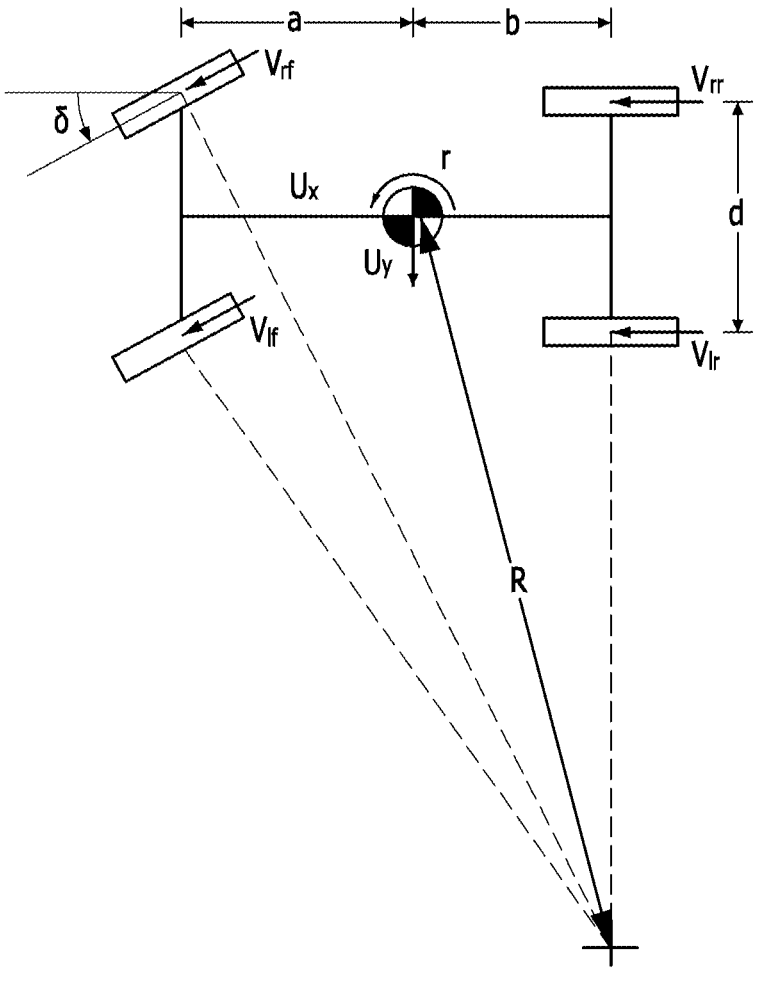
FIG. 1 is an example view illustrating a method of calculating a steering angle using vehicle dynamics.

Hereinafter, a steering angle estimation device and method of an electric steering system will be described with reference to the accompanying drawings through embodiments of the present disclosure.

In the specification and drawings, thicknesses of lines in the drawings and sizes of constituent elements may be exaggerated for clarity and convenience. Further, the following terms will be defined, considering functions thereof in the present disclosure, and may be varied according to intentions and customs of a user or an operator. Therefore, the terms should be defined on the basis of the contents of the entire specification.

Hereinafter, embodiments of the present disclosure will be described in detail with reference to the accompanying drawings so that a person having ordinary skill in the art to which the present disclosure pertains may easily put the present disclosure into practice. However, the present disclosure may be variously modified or altered in forms but is not limited to following embodiments. For the sake of brevity, parts not pertinent to the description have been omitted from the drawings, and like parts have been designated by like reference numerals throughout the specification.

Throughout the specification, it will be understood that terms "comprise", "include", "have", and any variations thereof used herein are intended to cover non-exclusive inclusions unless explicitly described to the contrary.

In addition, the implementations described herein may be embodied as, for example, a method, a process, a device, a software program, a data stream, or signals. Even in the case in which the present disclosure has been discussed in the context of a single form of implementation (e.g., only discussed as a method), the discussed features may also be realized in another form (e.g., a device or a program). The device may be implemented as a suitable form, such as hardware, software, or firmware. The method may be realized in a device, such as a processor, typically referred to as a processing device including, for example, a computer, a microprocessor, an integrated circuit, a programmable logic device, or the like.

FIG. 1 is an example view illustrating a method of calculating a steering angle using vehicle dynamics.

Referring to FIG. 1, a yaw rate $\gamma$ may be calculated based on a wheel speed using the Equation 1 below.

$$\gamma = \frac{V_{rf} - V_{lf}}{d \cdot \cos(\delta)} = \frac{V_{rr} - V_{lr}}{d} \qquad \text{Equation 1}$$

$$\gamma = \frac{V}{R} = \frac{V_{rr} - V_{lr}}{d}, \qquad \text{①}$$

$$R = \frac{V}{\gamma}, \text{ and} \qquad \text{②}$$

$$\delta = \arctan\left(\frac{a+b}{R}\right), \qquad \text{③}$$

where $V_{rf}$ means the front right wheel speed, $V_{lf}$ means the front left wheel speed, $V_{rr}$ means the rear right wheel speed, $V_{lr}$ means the rear left wheel speed, R means the turning radius, and $\delta$ means the steering angle.

Based on the wheel speed as described above, the yaw rate $\gamma$ is calculated as shown in ①, and the turning radius R is calculated as shown in ②. Based on the turning radius R, the steering angle $\delta$ is calculated as shown in ③.

However, this is a result derived using basic vehicle dynamics.

As described already in the background technology, estimating the steering angle based on vehicle dynamics suffers from low responsiveness and accuracy.

Therefore, the present disclosure describes a steering angle estimation method that improves responsiveness and accuracy.

Figure 2:
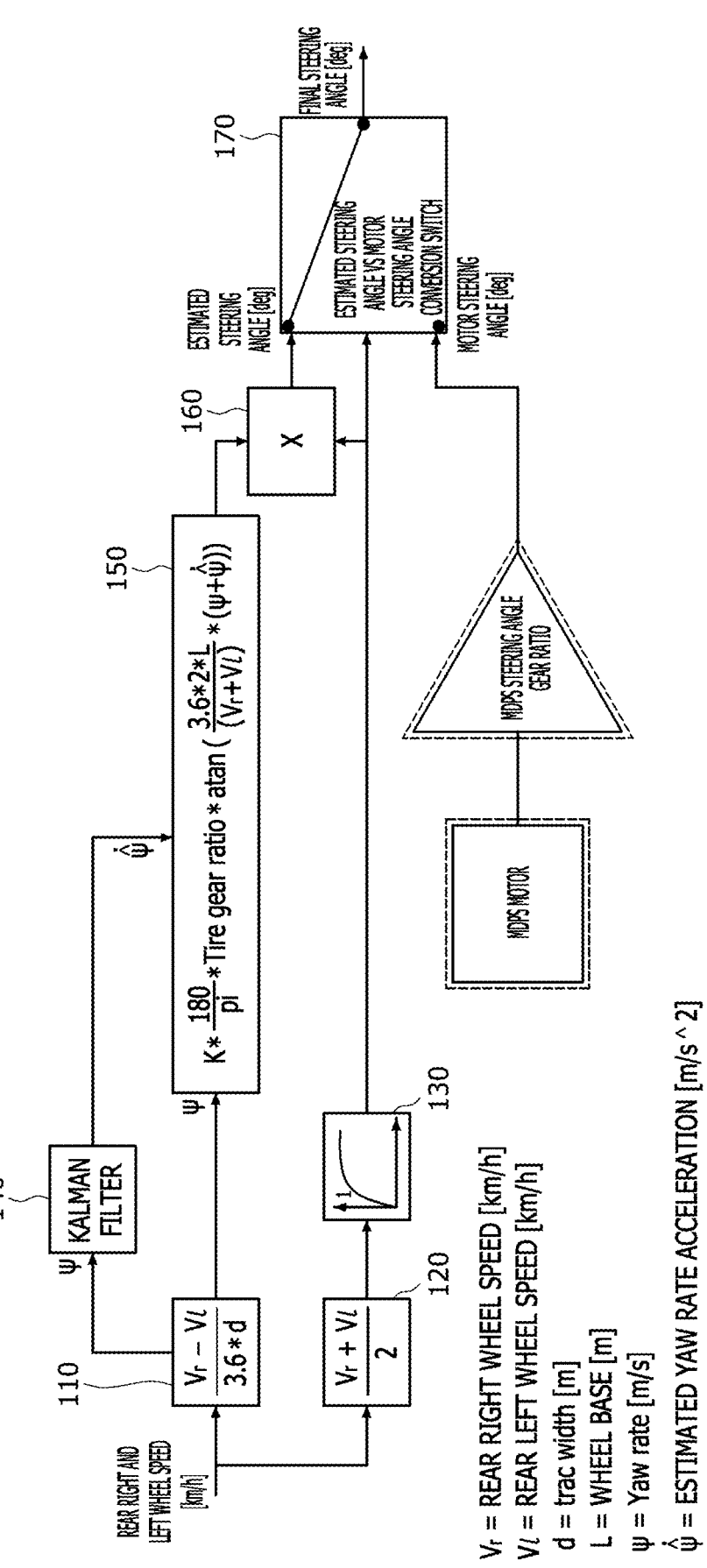
FIG. 2 is an example view illustrating a schematic configuration of a steering angle estimation device of an electric steering system according to an embodiment of the present disclosure.

FIG. 2 is an example view illustrating a schematic configuration of a steering angle estimation device of an electric steering system according to an embodiment of the present disclosure.

Referring to FIG. 2, the steering angle estimation device includes: a first operator 110 configured to calculate a yaw rate $\psi$ (m/s) using left and right speed values (km/h) of the rear wheels, a rear right wheel speed Vr and a rear left wheel speed Vl, and a track width (m); a second operator 120 configured to calculate an average value of the rear right wheel speed Vr and the rear left wheel speed Vl; a Kalman filter 140 configured to predict a yaw rate acceleration $\dot{\psi}$ (i.e., a yaw acceleration) by filtering the yaw rate $\psi$ calculated by the first operator 110; a third operator 150 configured to estimate a steering angle also taking into account a slip angle by using the yaw rate $\psi$ calculated by the first operator 110 and the yaw rate acceleration (i.e., the yaw acceleration) predicted by the Kalman filter 140 and to enable sensitivity tuning of the steering angle according to the characteristics of the vehicle using a constant K; a weight adjuster 130 configured to adjust the weights of the wheel speeds by averaging the values of the rear right wheel speed Vr and the rear left wheel speed Vl calculated by the second operator 120; a multiplication operator 160 configured to multiply weight values output by the weight adjuster 130 with the steering angle estimated by the third operator 150; and a steering angle conversion switch 170 configured to output a final steering angle (deg.) by selecting the estimated steering angle (deg.) output from the multiplication operator 160 or a motor steering angle (deg.) measured from a motor of a motorized power steering system (MDPS) by the weight values output from the weight adjuster 130.

Here, the weight adjuster 130 decreases the weight of steering angle estimation when the vehicle speed is determined to be low. When the wheel speed occurs, the steering angle may be estimated, and thus the weight adjuster 130 increases the weight. When designed in this structure, the steering angle may be accurately estimated using only the wheel speeds of the rear wheels.

In addition, in the present embodiment, in order to derive the yaw rate $\psi$ acceleration $\dot{\psi}$ (i.e., the yaw acceleration), it is necessary to differentiate the yaw rate $\psi$ (m/s). In this case, a situation in which the noise of the existing yaw rate $\psi$ (m/s) is amplified may occur. In addition, in a case where a low pass filter (LPF) is used, large delays may degrade the control performance. To prevent this, the Kalman filter 140 is used to derive the yaw rate acceleration $\dot{\psi}$ (i.e., the yaw acceleration) based on the value of the yaw rate $\psi$ (m/s). In this manner, the steering angle estimation performance of the present embodiment is significantly improved by the use of the Kalman filter 140.

As described above, the present embodiment is designed by reflecting the Kalman filter 140 and the weight adjuster 130, which takes into account the weighting influence of wheel speed, and is thus characterized by greatly improved steering angle estimation performance and high robustness to noise.

For reference, in the present embodiment, the Kalman filter 140 designs a system model and defines system noise and sensor noise.

The system noise may typically be derived using covariance, and the sensor noise may be derived by tuning or in accordance with sensor manufacturer's guidelines.

FIG. 3 is an example view illustrating matrices obtained from system models of the Kalman filter of FIG. 2.

Referring to FIG. 3, in the actual use of the Kalman filter 140, variables that may be set by the user are only system models A, H, Q, and R. The remaining variables are used in the internal computation process. Here, A and H are the matrices obtained from the state equations of the system, Q and R are the noise matrices defining noises, where x is a state variable, z is a measurement, w is noise, and v is measured noise.

A method of calculating system parameter values of the Kalman filter 140 will be described as follows.

The Kalman filter 140 selects an initial value ($\hat{x}_0$, $P_0$).

Estimated value and error covariance prediction is performed:

$$\hat{\bar{x}}_k = A\hat{x}_{k-1}, P_k^- = AP_{k-1}A^T + Q,$$

where $\hat{\bar{x}}_k$ = {Yaw Rate/Yaw Acceleration}.

Kalman gain calculation is performed:

$$K_k = P_k^- H^T \left(HP_k^{-1}H^T + R\right)^{-1}.$$

Estimated value calculation is performed: $\hat{x}_k = \bar{\bar{x}}_k + K_k(z_k - H\bar{\bar{x}}_k)$.

In addition, error covariance calculation is performed:

$$P_k = P_k^- - K_k HP_k^-.$$

Here, covariance $Q = w_k$, covariance $R = v_k$, and $x_{k+1} = A_{xk} + w_k$, $z_k = Hx_k + v_k$ are set. A subscript, such as 0 or k, indicates the position of the data in a series of data, and superscripts "–" and "^" indicate predicted and estimated values, respectively. In addition, z is the measured value, x is the output value, P is the error covariance, and K is the Kalman gain.

That is, the Kalman filter 140 may design a system model, define system noise and sensor noise, and estimate a predicted value of the yaw acceleration $\dot{\psi}$ (i.e., the yaw acceleration) by the following process.

Accordingly, delays that would occur when noise is conventionally removed using a low pass filter (LPF) may be reduced, thereby improving the yaw estimation performance.

However, the steering angle estimated in this manner has limitations in certain cases.

Unexpectedly, the estimated steering angle may differ from the actual steering angle due to variations in the road surface, lateral force caused by wind, tire wear, and the like.

To improve this, a solution is to monitor the straightness of the vehicle, set the initial motor angle to 0° in the straight state, and only use the motor angle thereafter. However, there is still the risk of using the estimated steering angle until the vehicle is driven straight.

Accordingly, the steering angle estimation method according to the present embodiment ensures that the estimated steering angle does not significantly differ from the actual steering angle at the time point when the actual wheel speed is generated and the steering angle is estimated, i.e., at the time point when the wheel speed output is determined to be sufficient to estimate the steering angle.

At the time point when there are various driving patterns and the vehicle speed is high, a difference between the actual steering angle and the estimated steering angle may occur due to various external factors. However, the key concept of the present disclosure is to apply the estimated steering angle as the initial angle of the motor angle immediately at the time of initial estimation, i.e., when the estimated steering angle weight gain 1 according to the average value of the wheel speed is initially reached.

In this case, although the estimated steering angle is not used until the vehicle moves straight, it is much more stable to store the absolute position of the motor angle in memory and control the steering angle by calculating the steering angle based on the motor in a case where the vehicle speed increases to a predetermined speed (i.e., the power output to the wheels increases up to the point where the steering angle may be estimated), which is the point where the estimated steering angle is available.

In this manner, there is no problem in performing position control during autonomous driving. In other words, when the present embodiment is applied to autonomous driving, the control logic and position control (i.e., the steering angle control) for autonomous driving may be accurately performed in all types of vehicles even without using a steering angle sensor. In addition, the present disclosure may be applied to systems such as rear-wheel steering (RWS) systems and general vehicles in the future.

Although the foregoing embodiments have been provided to illustrate the present disclosure in conjunction with the accompanying drawings, it will be apparent to a person having ordinary skill in the art that the embodiments are given by way of illustration only, and that various modifications and equivalent embodiments can be made without departing from the spirit and scope of the present invention. Accordingly, the scope and spirit of the present disclosure should be defined only by the following claims.

What is claimed is:

1. A steering angle estimation device of an electric steering system, the steering angle estimation device comprising:
   a first operator configured to receive rear wheel speeds and calculate a yaw rate using the rear wheel speeds;
   a second operator configured to receive the rear wheel speeds and calculate an average value of the rear wheel speeds;
   a Kalman filter configured to receive the yaw rate from the first operator and predict a yaw acceleration by filtering the yaw rate calculated by the first operator;
   a third operator configured to receive the predicted yaw acceleration from the Kalman filter and the yaw rate calculated by the first operator and estimate a steering angle also taking into account a slip angle by using the yaw rate calculated by the first operator and the yaw acceleration predicted by the Kalman filter;

a weight adjuster configured to adjust weights of the rear wheel speeds by averaging a rear right wheel speed and a rear left wheel speed of the rear wheel speeds calculated by the second operator;

a multiplication operator configured to multiply weight values output by the weight adjuster with the steering angle estimated by the third operator; and a steering angle conversion switch configured to output a final steering angle by selecting the estimated steering angle output from the multiplication operator or a motor steering angle measured from a motor of a motorized power steering system by the weight values output from the weight adjuster.

2. The steering angle estimation device of claim 1, wherein the first operator calculates the yaw rate using the rear right wheel speed, the rear left wheel speed, and a track width.

3. The steering angle estimation device of claim 1, wherein the average value of the rear wheel speeds is an average value of the rear right wheel speed and the rear left wheel speed.

4. The steering angle estimation device of claim 1, wherein the third operator performs sensitivity tuning of the steering angle according to characteristics of a vehicle using a constant.

5. The steering angle estimation device of claim 1, wherein in response that the rear wheel speeds are sufficient to estimate the steering angle, the weight adjuster increases the weights.

6. A steering angle estimation method of an electric steering system, the steering angle estimation method comprising:

calculating, by a first operator using rear wheel speeds, a yaw rate;

calculating, by a second operator, an average value of the rear wheel speeds;

predicting, by a Kalman filter, a yaw acceleration by filtering the yaw rate calculated;

estimating, by a third operator operatively connected to the first operator and the Kalman filter, a steering angle also taking into account a slip angle by using the yaw rate calculated by the first operator and the yaw acceleration predicted by the Kalman filter;

adjusting, by a weight adjuster operatively connected to the second operator, weights of the rear wheel speeds by averaging a rear right wheel speed and a rear left wheel speed of the rear wheel speeds calculated by the second operator;

multiplying, by a multiplication operator, weight values output by the weight adjuster with the steering angle estimated by the third operator; and outputting, by a steering angle conversion switch, a final steering angle by selecting the estimated steering angle output from the multiplication operator or a motor steering angle measured from a motor of a motorized power steering system by the weight values output from the weight adjuster.

7. The steering angle estimation method of claim 6, wherein the first operator calculates the yaw rate using the rear right wheel speed, the rear left wheel speed, and a track width.

8. The steering angle estimation method of claim 6, wherein in the calculating the average value of the rear wheel speeds, the average value of the rear wheel speeds is an average value of the rear right wheel speed and the rear left wheel speed.

9. The steering angle estimation method of claim 6, wherein in the estimating the steering angle, the third operator performs sensitivity tuning of the steering angle according to characteristics of a vehicle using a constant.

10. The steering angle estimation method of claim 6, wherein in the adjusting the weights of the rear wheel speeds, in response that the rear wheel speeds are sufficient to estimate the steering angle, the weight adjuster increases the weights.

11. A steering angle estimation device of an electric steering system for a vehicle, the steering angle estimation device comprising:

a processor; and a non-transitory storage medium containing program instructions, wherein the processor is configured to, by executing the program instructions:

receive rear wheel speeds and calculate a yaw rate using the rear wheel speeds;

calculate an average value of the rear wheel speeds;

predict a yaw acceleration by use of a Kalman filter filtering the yaw rate;

estimate a steering angle also taking into account a slip angle by using the yaw rate and the yaw acceleration predicted by the Kalman filter;

adjust weights of the rear wheel speeds by averaging a rear right wheel speed and a rear left wheel speed of the rear wheel speeds;

multiply weight values output with the steering angle with the steering angle estimated; and output a final steering angle by selecting the estimated steering angle or a motor steering angle measured from a motor by the weight values; and control the steering angle of the vehicle according to the final steering angle.

12. The steering angle estimation device of claim 11, wherein the processor is further configured to calculate the yaw rate using the rear right wheel speed, the rear left wheel speed, and a track width.

13. The steering angle estimation device of claim 11, wherein the average value of the rear wheel speeds is an average value of the rear right wheel speed and the rear left wheel speed.

14. The steering angle estimation device of claim 11, wherein the processor is further configured to perform sensitivity tuning of the steering angle according to characteristics of the vehicle using a constant.

15. The steering angle estimation device of claim 11, wherein in response that the rear wheel speeds are sufficient to estimate the steering angle, the processor is further configured to increase the weights.

* * * * *